United States Patent [19]

Mitchell et al.

[11] Patent Number: 6,094,454
[45] Date of Patent: Jul. 25, 2000

[54] MULTI-SPECTRAL IMAGE COMPRESSION AND TRANSFORMATION

[75] Inventors: Joan LaVerne Mitchell, Cortlandt Manor; Boon-Lock Yeo, Yorktown Heights, both of N.Y.

[73] Assignee: International Business Machines Corporation, Armonk, N.Y.

[21] Appl. No.: 08/879,097

[22] Filed: Jun. 19, 1997

[51] Int. Cl.$^7$ .................................................. H04N 11/02
[52] U.S. Cl. ................................. 375/240; 348/395
[58] Field of Search ............................. 375/240; 348/32, 348/33, 34, 384, 385, 386, 387, 390, 391, 393, 394, 395; 382/166, 232; 358/1.15; H04N 11/02

[56] References Cited

U.S. PATENT DOCUMENTS

| | | |
|---|---|---|
| 5,155,592 | 10/1992 | Verbiest et al. . |
| 5,162,898 | 11/1992 | Aono . |
| 5,172,237 | 12/1992 | Blonstein et al. . |
| 5,287,420 | 2/1994 | Barrett . |
| 5,412,427 | 5/1995 | Rabbani et al. . |
| 5,956,467 | 9/1999 | Rabbani et al. ......................... 382/166 |
| 5,999,710 | 12/1999 | Smith et al. ........................... 358/1.15 |

OTHER PUBLICATIONS

"An Interband Coding Extension of the New Lossless JPEG Standard," by N Memon, X. Wu, V. Sippy and G. Miller.

*Primary Examiner*—Young Lee
*Attorney, Agent, or Firm*—James A. Lucas; Driggs, Lucas, Brubaker & Hogg Co., L.P.A.

[57] ABSTRACT

A system and method for compressing and decompressing multi-spectral images in two color spaces is provided. The system and method employ the transformation, compression and reconstruction of color space components from which difference data between the original color space components and the reconstructed color space components may be derived. A compressed data stream including compressed color space data and compressed difference data in a another color space is generated. The difference data may be utilized to reconstruct a lossless or near lossless image of the original.

6 Claims, 7 Drawing Sheets

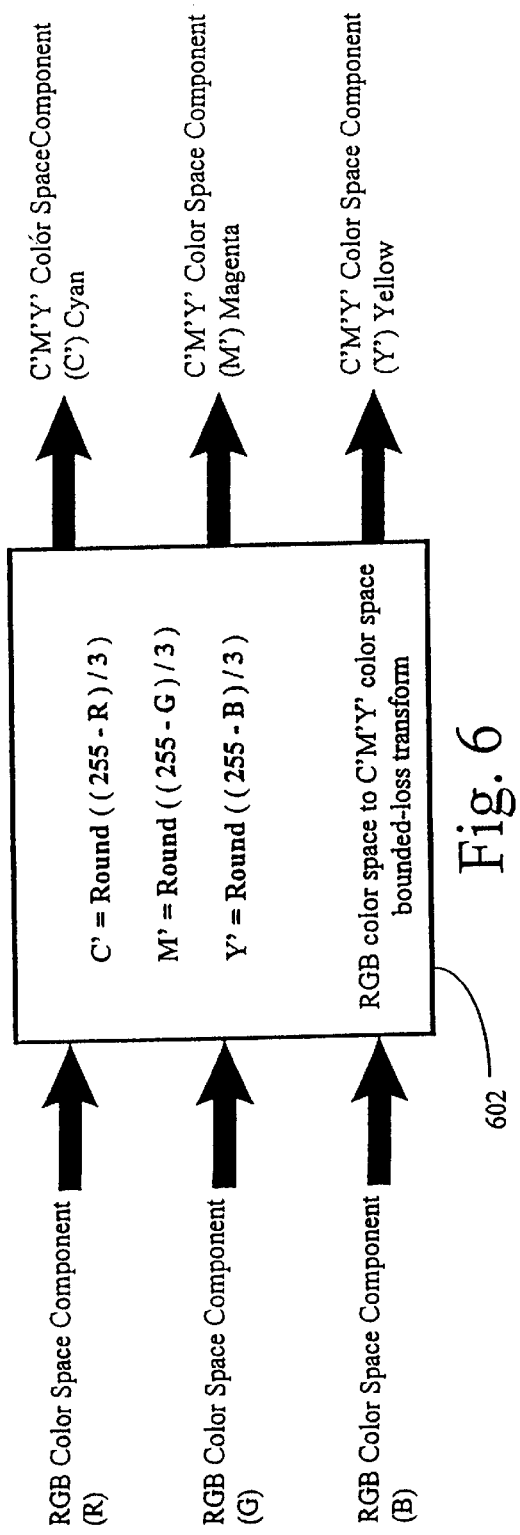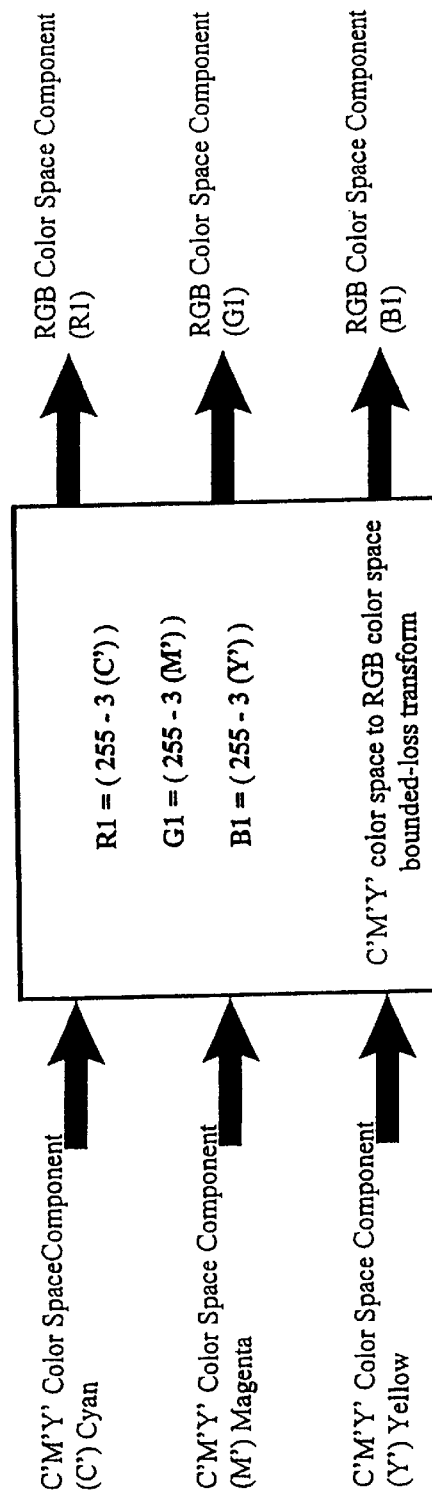
Fig. 6
Fig. 7

MULTI-SPECTRAL IMAGE COMPRESSION AND TRANSFORMATION

FIELD OF THE INVENTION

The invention relates generally to the compression of digital images, more particularly, to methods for compressing multi-spectral images in different spectral spaces and transforming images from one spectral space to another with bounded loss.

BACKGROUND OF THE INVENTION

A multi-spectral image is a collection of two or more monochrome images of the same scene. Multi-spectral images can be described in any one of a plurality of known spectral or color spaces. For example, one well-known multi-spectral image is an RGB color image. An RGB color image consists of a red, a green, and a blue component and, thus, the image is said to be described in RGB spectral space. Other spectral spaces (sometimes hereinafter referred as color space(s)) include the CIE (Commission Internationale de L'Eclairage) L* a* b*, CIE XYZ, CIE L* u* v*, CIE YUV, CMY (Cyan, Magenta, Yellow), CMYK (Cyan, Magenta, Yellow, blacK), CCIR (Comite Consultatif International des Radiocommunications) 601 YCbCr, YIQ, HIS, and HSV spectral spaces. See *Television Engineering Handbook*, Featuring HDTV Systems, Revised Edition by K. Blair Benson, revised by Jerry C. Whitaker (McGraw-Hill, 1992) for more information on color spaces.

Digital multi-spectral images, as well as all digital images, are represented by an array of pixels. Each pixel of a digital multi-spectral image is defined by numerical components that represent the color of the pixel. For example, if a digital multi-spectral image is described in RGB spectral space, each pixel of the image is defined by three numerical values representing the colors of red, green, and blue.

One of the most common ways of generating a digital multi-spectral image in RGB spectral space is via a color scanner that is in communication with a computer system. The color scanner typically acquires the digital image by scanning a source (e.g., a photograph) with sensors sensitive to three color wavelengths: red, green, and blue. Upon completion of the scan, a digital multi-spectral image of the source is generated in RGB spectral space from the acquired data and can be displayed on a computer monitor or other display device.

Because digital images, and multi-spectral digital images in particular, are described by large amounts of data (e.g., in RGB spectral space, each pixel is described by three numerical values) various compression techniques have been developed to compress the image data to provide for the efficient storage, access and transmission of the digital image.

On a general level, data compression entails the coding of original data into secondary data, from which, the original data can again be derived. Generally, the secondary or coded data, will be quantitatively less than the original data. Data compression falls into two general categories: lossy and lossless. In a lossy system, data is compressed with the knowledge and foresight that the reconstructed data will not be an identical replica of the original data, but only a close approximation. Conversely, a lossless system is one that produces an exact replica of the original data from the compressed data. One well-known compression technique is defined by the JPEG (Joint Photographic Experts Group) standard. A more recent JPEG standard for the lossless and near-lossless compression of images called JPEG-LS. For more information on JPEG-LS, see *Information Technology—Lossless and Near-Lossless Compression of Continuous-Tone Still Images*, ISO/IEC CD 14495:1997(E) March 1997. Other well-known compression standards also exist, such as JBIG and GIF.

Lossy compression of image data is generally acceptable because it is known that the human eye perceives small changes in color less accurately than small changes in brightness. Accordingly, small losses in digital image information that impacts color data caused by lossy compression and decompression are acceptable. Furthermore, display devices such as computer monitors and televisions are inherently lossy in that they cannot display all of the information contained in an image and therefore small losses of image information are difficult to perceive on such lossy devices. Moreover, lossy compression and decompression techniques offer superior compression ratios compared to lossless compression and decompression techniques.

However, other devices such as digital printers, and digital color printers in particular, are far less tolerant of lossy image information. To compound this problem, most digital color printers require image information in the CMYK spectral space. Thus, an image that is described in RGB spectral space must be transformed into CMYK spectral space before the digital color printer can print it.

In addition to scanning in the RGB color space and printing in the CMYK color space, image compression is often done in a third color space. Most JPEG images are compressed in the YCbCr color space. For MPEG-1 this is the only allowed color space. The luminance component (Y) is compressed with better quality than the color components Cb and Cr since the human visual system is more forgiving of loss in these color components. However, the transformation from RGB to YCbCr and back to RGB (or on to CMY) is inherently lossy.

Accordingly, given a lossy image compression and decompression technique and a lossy spectral space transformation(s), digital multi-spectral image information may be significantly lost from the time the image is first acquired to the time it is, for example, printed on a digital color printer. The result is often a color image which is lacking in quality as compared to the original image. Hence, a method for compressing multi-spectral digital images which does not suffer from this and other disadvantages is desired.

SUMMARY OF THE INVENTION

According to the present invention, a method for the compression and decompression of digital multi-spectral images is provided. The method includes the steps of compressing a plurality of first color space components to thereby generate first color space compressed data; reconstructing the first color space compressed data into a plurality of reconstructed first color space components; transforming the plurality of first color space components to a first set of second color space components; transforming the plurality of reconstructed first color space components to a second set of second color space components; determining component differences based on the difference between the first and second sets of second color space components; and compressing the component differences.

It is therefore an advantage of the present invention to provide a method for compressing multi-spectral images in two color spaces and providing for the near-lossless reconstruction of the images from the two compressed color spaces.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 6 is a block diagram of an RGB color space to C'M'Y' color space bounded-loss transformer;

FIG. 7 is a block diagram of a C'M'Y' color space to RGB color space bounded-loss transformer;

DETAILED DESCRIPTION OF ILLUSTRATED EMBODIMENTS

Figure 1:
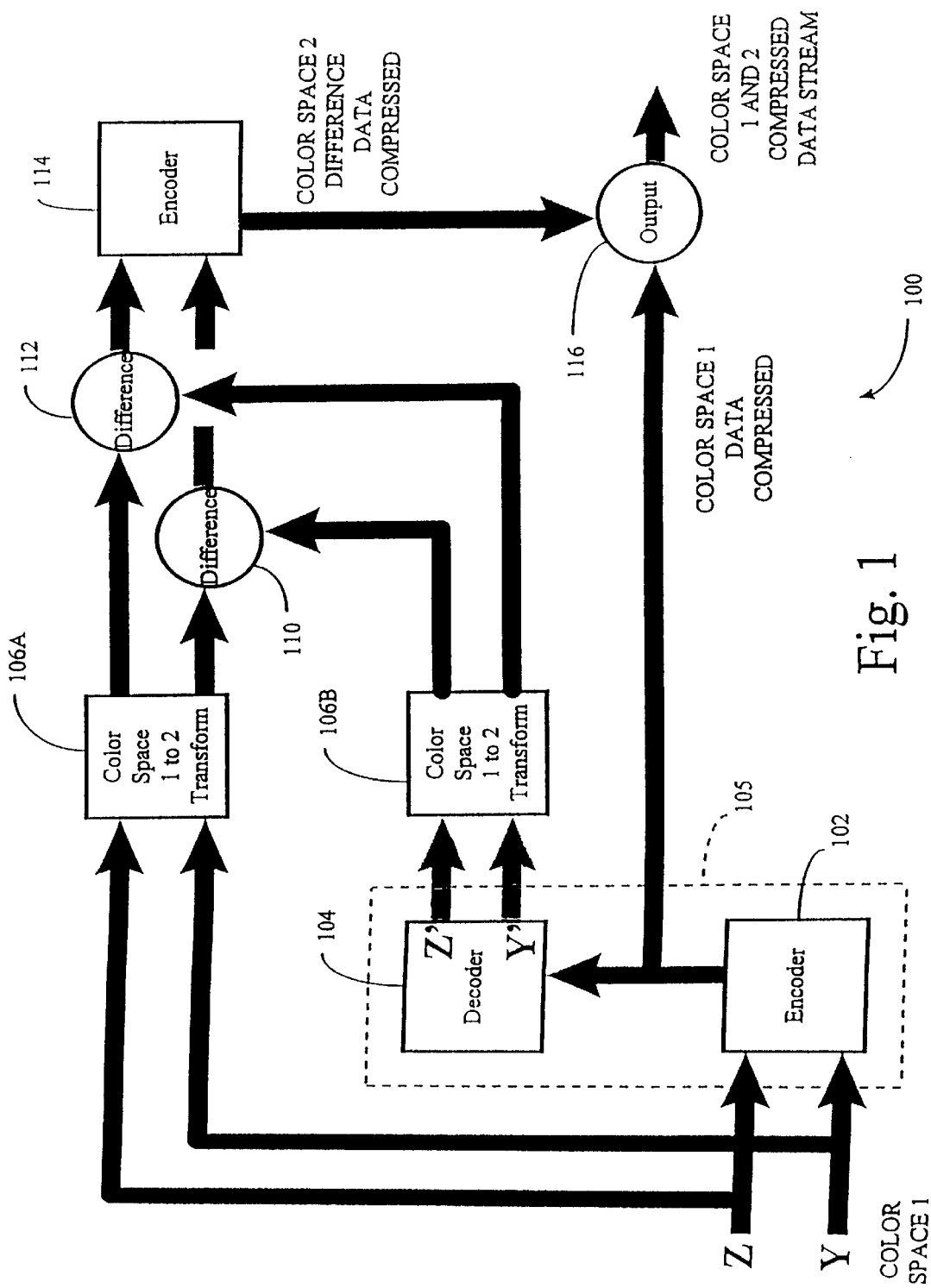
FIG. 1 is a data flow block diagram of a first embodiment of the present invention having compression in two color spaces with one color space transformation.

Referring now to the drawings, three embodiments of the present invention will now be described. The first and third illustrated embodiments employ the compression of a digital multi-spectral image in two spectral or color spaces. The second illustrated embodiment employs the compression of a digital multi-spectral image in two spectral or color spaces with three spectral or color transformations. In each embodiment, compressed image data in at least two different spectral or color spaces is produced. Additionally, each of the embodiments is illustrated with two components of the spectral space (i.e., Z, Y and A, B) for simplicity. Though the illustrated embodiments are described with regard to only two spectral space components, it should be understood that the discussions are equally applicable to all of the components of a spectral or color space (e.g., third, fourth, fifth, etc.). Moreover, hereinafter the reference to a spectral or color space transformation refers to the process of transforming multi-spectral image data from a first color space to a second color space, which may in itself be performed more than once on different data. Hence an embodiment may employ a single color space transformation more than once, as is the case when two or more sets of data are subject to the same color transformation, but will still be referred to as employing a single color-space transformation. Accordingly, an embodiment may also employ two or more color space transformations (i.e., color space 1 to color space 2; color space 2 to color space 3; etc.) as part of its compression/decompression technique. The present discussion will now focus on each of the embodiments.

First Embodiment

Two Color Spaces; One Color Space Transformation

Illustrated in FIG. 1 is a data flow block diagram illustrating the functions necessary to compress a multi-spectral image defined by a single color space into compressed image data representing two color spaces and accomplished with one color space transformation. Specifically, color space 1 components (Z and Y) of a multi-spectral image are input into an encoder 102 for data compression. Color space 1 may be any color space, such as RGB color space, for example. Data compression and decompression may be by any known method such as JPEG, GIF, etc., however JPEG baseline compression/decompression is preferred. JPEG baseline compression/decompression provides for the encoding of an image via a top-to-bottom scan. For more information on JPEG, see *Information Technology—Digital Compression and Coding of Continuous-Tone Still Images—Part 1: Requirements and Guidelines*, ITU-T Recommendation T.81 (1992) | ISO/IEC 10918-1:1993. Alternatively, proprietary compression/decompression techniques may also be employed.

The encoder 102 outputs compressed color space 1 data to two paths. One path of compressed color space 1 data is input into output function 116 for incorporation into a final color space 1 and 2 compressed data stream. A second path of compressed color space 1 data is input into a decoder 104 to generate reconstructed color space 1 components (Z' and Y'). Since the compression/reconstruction performed by encoder 102 and decoder 104 is lossy, in the case of a lossy compression/decompression technique, reconstructed color space 1 components (Z' and Y') are not identical to the originally compressed color space 1 components (Z and Y). The encoder 102 and decoder 104 are preferably included within a primary encoder 105 since the process of encoding can include the sub-process of reconstructing the encoded data. This reconstruction is performed because the encoder must be privy to the decoder's decompression behavior.

The reconstructed color space 1 components (Z' and Y') are output from decoder 104 and input into color space 1 to color space 2 transformer 106B to generate a first set of color space 2 components. Color space 1 to color space 2 transformer 106B, as well as all other color space transformers hereinafter described, is preferably software logic which incorporates conventional color space transformation algorithms. Alternatively, hardware logic incorporating the color space transformation algorithms may also be employed. Conventional color space transformation algorithms are well-known. In the present embodiment, color space 1 may be RGB color space and color space 2 may be YCbCr color space. Other color space combinations are also possible.

The output of color space 1 to color space 2 transformer 106B includes the output of each component of color space 2 that is generated from reconstructed color space 1 components (Z' and Y'). The illustrated embodiment shows only two outputs for clarity. Just as the reconstructed color space 1 components (Z' and Y') were transformed to color space 2 components, the uncompressed color space 1 components (Z and Y) are input into color space 1 to color space 2 transformer 106A from which a second set of color space 2 components are generated. The corresponding color space 2 components generated from transformers 106A and 106B are input into difference functions 110 and 112. The output of difference functions 110 and 112 are input into encoder 114 for data compression. As described above, the data compression may be via any known technique, however, differential JPEG compression is preferred. In differential JPEG compression, difference data between the original component data and encoder reconstructed inverse transformed component data is coded as a differential JPEG frame. For more information on JPEG, see *Information Technology—Digital Compression and Coding of*

*Continuous-Tone Still Images—Part 1: Requirements and Guidelines*, ITU-T Recommendation T.81 (1992) | ISO/IEC 10918-1:1993. Alternatively, any compression/decompression technique capable of handling differences may also be employed, including proprietary techniques. Accordingly, the output of encoder 114 is input into output function 116 for incorporation into a final color space 1 and 2 compressed data stream. The output of encoder 114 represents the loss or error introduced by the lossy compression/reconstruction of color space 1 components in terms of color space 2 difference data.

The compressed data, both color space 1 and difference color space 2 data, can now be exported to a file or other device, such as a printer, for processing. By knowing the error introduced by the lossy compression and reconstruction of the color space 1 multi-spectral image, a correction based on the color space 2 difference data can be used during the subsequent decompression and transformation of compressed color space 2 data to provide a less-lossy or lossless compression and decompression process. This is especially desirable when the decompressed multi-spectral image is desired to be defined by color space 2 components.

Second Illustrated Embodiment

Three Color Spaces; Two Color Space Transformations

Figure 2:
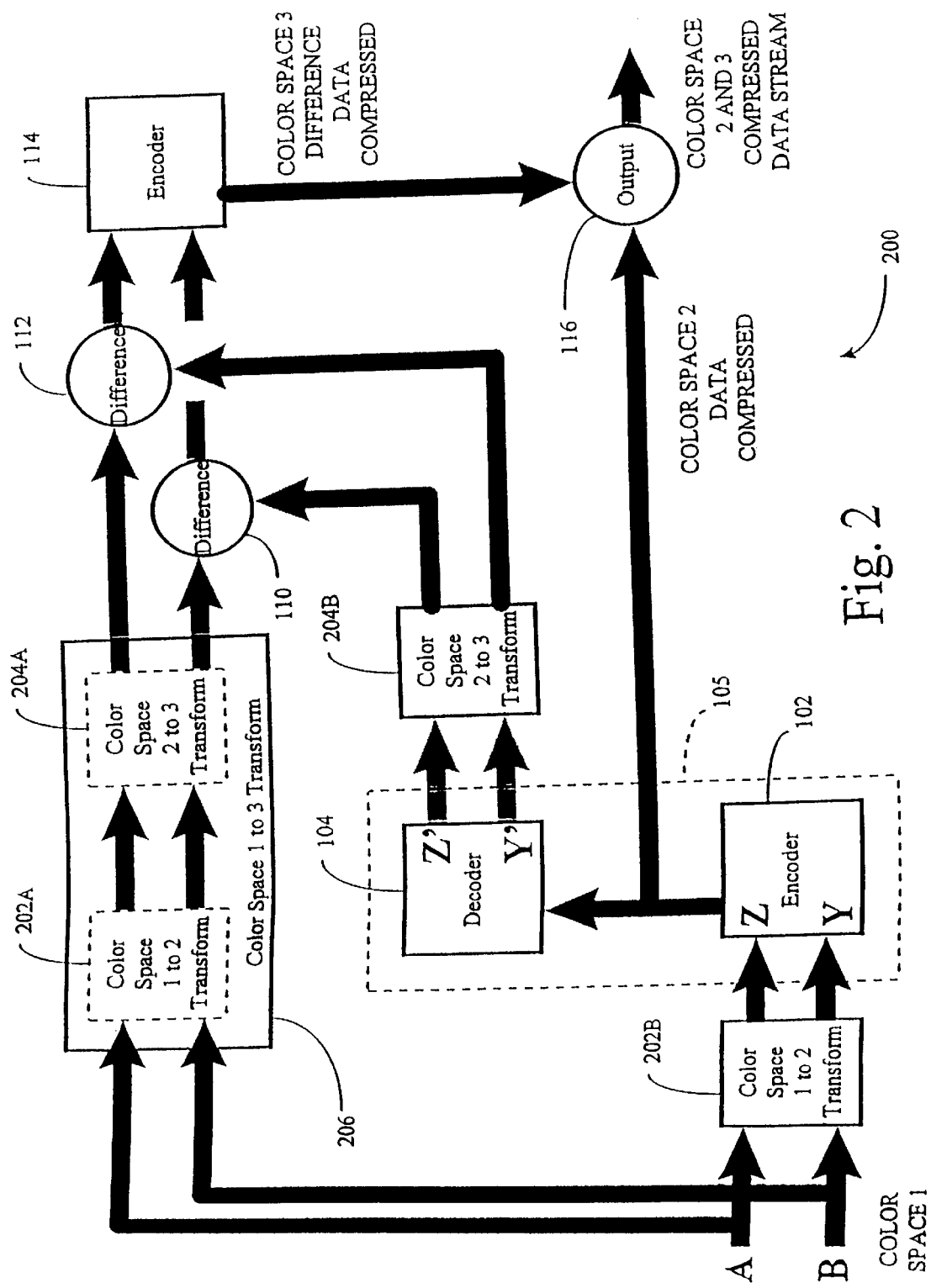
FIG. 2 is a data flow block diagram of a second embodiment of the present invention having compression in three color spaces with two color space transformations.

Referring now to FIG. 2, a data flow block diagram illustrating the functions necessary to compress a multi-spectral image defined by a single color space into compressed image data representing two color spaces and accomplished with two color space transformations. More particularly, color space 1 components (A and B) are input into a color space 1 to color space 2 transformer 202B. For example, color space 1 to color space 2 transformer 202B may transform RGB color space components into CIE L* a* b* color space components. The color space 2 components are input into encoder 102 for compression. The encoder 102 outputs compressed color space 2 data to two paths. One path of compressed color space 2 data is input into output function 116 for incorporation into the final color space 2 and 3 compressed data stream. A second path of compressed color space 2 data is input into a decoder 104 to generate reconstructed color space 2 components (Z' and Y'). Since the compression/reconstruction performed by encoder 102 and decoder 104 is lossy, the reconstructed color space 2 components (Z' and Y') are not identical to the originally compressed color space 2 components (Z and Y).

The reconstructed color space 2 components (Z' and Y') are output from decoder 104 and input into color space 2 to color space 3 transformer 204B to generate a first set of color space 3 components. Color space 3 may be CMYK color space, or any other color space. The output of color space 2 to color space 3 transformer 204B includes the output of each component of color space 3 that is generated from the reconstructed color space 2 components (Z' and Y'). As described above, only two components are shown for clarity.

The color space 1 components (A and B) are further input into color space 1 to color space 3 transformer 206. The output transformer 202A includes all of the components of color space 2 and are input into color space 2 to color space 3 transformer 204A. The corresponding color space 3 components generated from transformers 204A and 204B are input into difference functions 110 and 112. The output of difference functions 110 and 112 are input into encoder 114 for data compression. The output of encoder 114 is input into output function 116 for incorporation into a final color space 2 and 3 compressed data stream. The output of encoder 114 represents the loss or error introduced by the lossy compression/reconstruction of color space 2 components in terms of color space 3 difference data.

Similar to the embodiment of FIG. 1, the errors due to the lossy compression and reconstruction of the color space 2 multi-spectral image, and possibly also the color space transformation from color space 2 to color space 3, can be corrected by the differential color space 3 data upon the subsequent decompression and transformation of the compressed color space 2 data to produce a less-lossy or lossless compression and decompression process. This is especially desirable when the decompressed, multi-spectral image is desired to be ultimately defined by color space 3 components.

Third Illustrated Embodiment

Two Color Spaces; One Color Space Transformation

Figure 3:
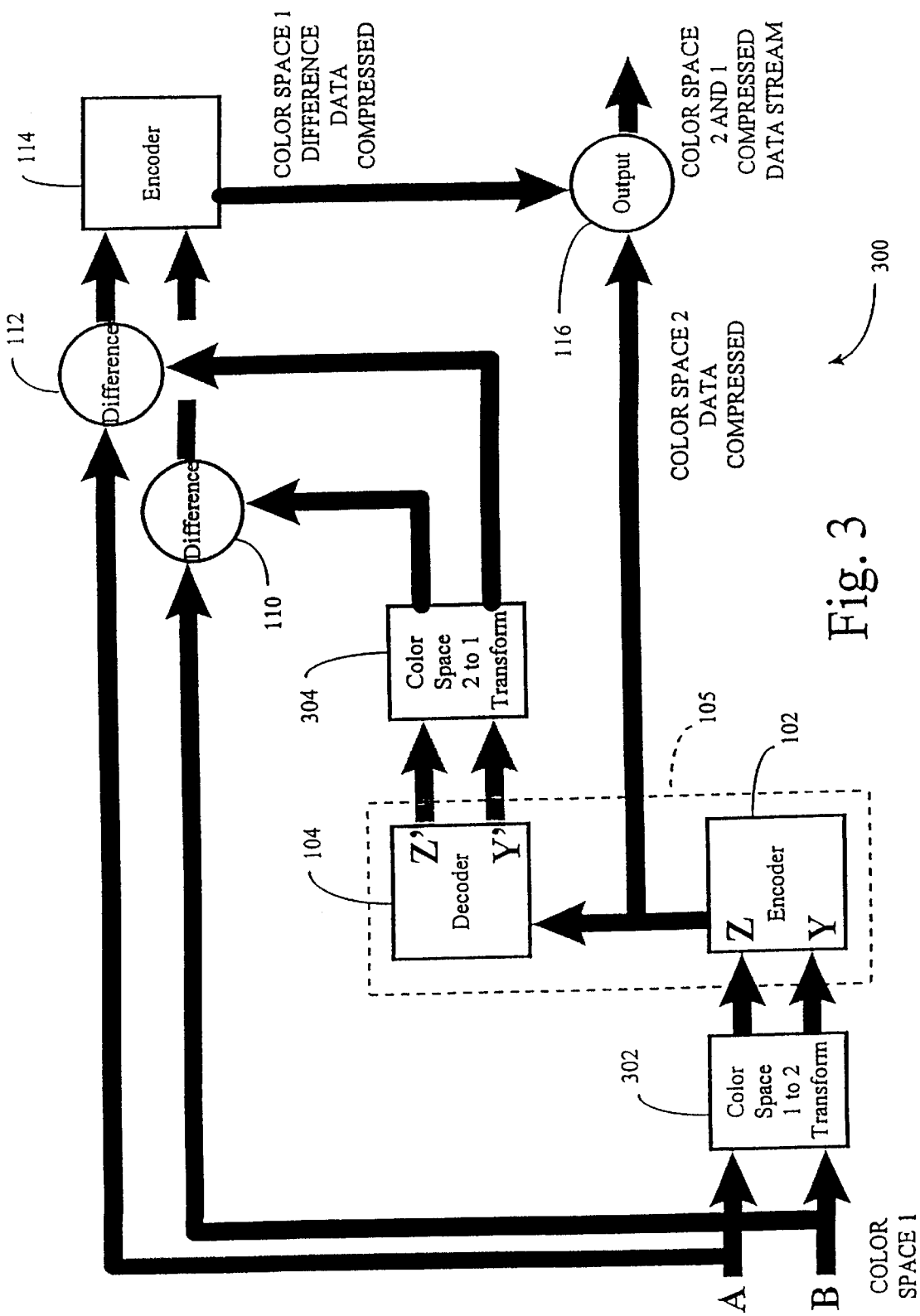
FIG. 3 is a data flow block diagram of a third embodiment of the present invention having compression in two color spaces with one color space transformation and its inverse transformation.

Illustrated in FIG. 3 is a data flow block diagram illustrating the functions necessary to compress a multi-spectral image defined by a single color space into compressed image data representing two color spaces and accomplished with one color space transformation and its inverse. Specifically, color space 1 components (A and B) are input into color space 1 to color space 2 transformer 302 to generate color space 2 components (Z and Y). The color space 2 components are input into encoder 102 for compression. The encoder 102 outputs compressed color space 2 data to two paths. One path of compressed color space 2 data is input into output function 116 for incorporation into the final color space 2 and 1 compressed data stream. A second path of compressed color space 2 data is input into a decoder 104 to generate reconstructed color space 2 component data. In as much as the compression/reconstruction performed by encoder 102 and decoder 104 is lossy, reconstructed color space 2 components (Z' and Y') are not identical to the originally compressed color space 2 components (Z and Y).

The reconstructed color space 2 components are output from decoder 104 and input into color space 2 to color space 1 transformer 304 to generate a new set of color space 1 components. The new color space 1 components are input into difference functions 110 and 112. Additionally, the original color space 1 components are correspondingly also input into difference functions 110 and 112 to generate color space 1 difference data. The output of difference functions 110 and 112 are input into encoder 114 for data compression. As described above, the data compression may be via any known technique, however, differential JPEG compression is preferred. Accordingly, the output of encoder 114 is input into output function 116 for incorporation into a final color space 2 and 1 compressed data stream. The output of encoder 114 represents the loss or error introduced by the lossy transformation of color space 1 into color space 2 and back to color space 1 and the lossy compression/decompression of color space 2 components.

In all of the embodiments, decompression of the compressed image data is accomplished by first separating each color space from the mixed color space compressed data stream output by output function 116. Each compressed color space is then reconstructed via the technique employed during compression (e.g., JPEG baseline and differential JPEG). Thereafter, each component of the reconstructed color spaces will be available for further processing.

It should be further noted that the present invention is applicable to the acquisition, compression, and decompression of satellite imagery. More particularly, satellites acquire images with a plurality of scanners having a plurality of scan frequencies. These frequencies include the visible spectrum and the non-visible spectrum, such as the ultraviolet, infrared, and radio frequency spectrums. Consequently, satellite images are typically comprised of spectral spaces having more than two components. Each spectral space component of a satellite image is traditionally referred to as a "band." Landsat 5 images, for example, are defined by a spectral space having seven bands. According, the present invention may be employed to generate a custom color space which mixes, or de-correlates, the original color space bands and which is more compressible than the original color space. The custom color space does not have to have the same number of bands as the original color space. Reconstruction and transformation back to the original color space provides for the determination of difference data between the original color space and the reconstructed and transformed original color space. The compressed custom color space components and the compressed difference data, defined in terms of the original color space components, can then be assembled into a compressed data stream. Alternatively, bounded-loss transformations to a custom color space that is more compressible than the original color space may be employed.

Compression of Multi-Spectral Images with Bounded Loss

It has been determined by the present inventors that the compression and decompression of multi-spectral images can be performed with bounded losses. To recall, color space transformation from one color space to another color space can be lossy. The present invention provides a technique for performing bounded-loss transformations by designing transformations such that the loss incurred is within a known range. An important characteristic in the design of the bounded-loss transformations of the present invention is noise-level present in the image. Noise is introduced into the image through the process of digitizing an analog image. Specifically, noise is introduced during the digitizing round-off process which results in the necessary integer precision color space components. Accordingly, a transformation designed with a bounded loss equal to or less than the image noise-level will not significantly degrade the image quality. Additionally, because the loss or error is bound, it may be corrected for upon reconstruction of the compressed color space data (e.g., color space 1) and transformation of the reconstructed color space data (e.g., color space 1) to the color space of the reconstructed difference data (e.g., color space 2). The present discussion will now discuss the bounded-loss transformations of the present invention for the three most widely employed color spaces (i.e., RGB, CMY, and YCbCr) and the transformations: (1) RGB color space to Y'Cb'Cr' color space and Y'Cb'Cr' color space back to RGB color space and (2) RGB color space to C'M'Y' color space and C'M'Y' color space back to RGB color space.

Figure 4:
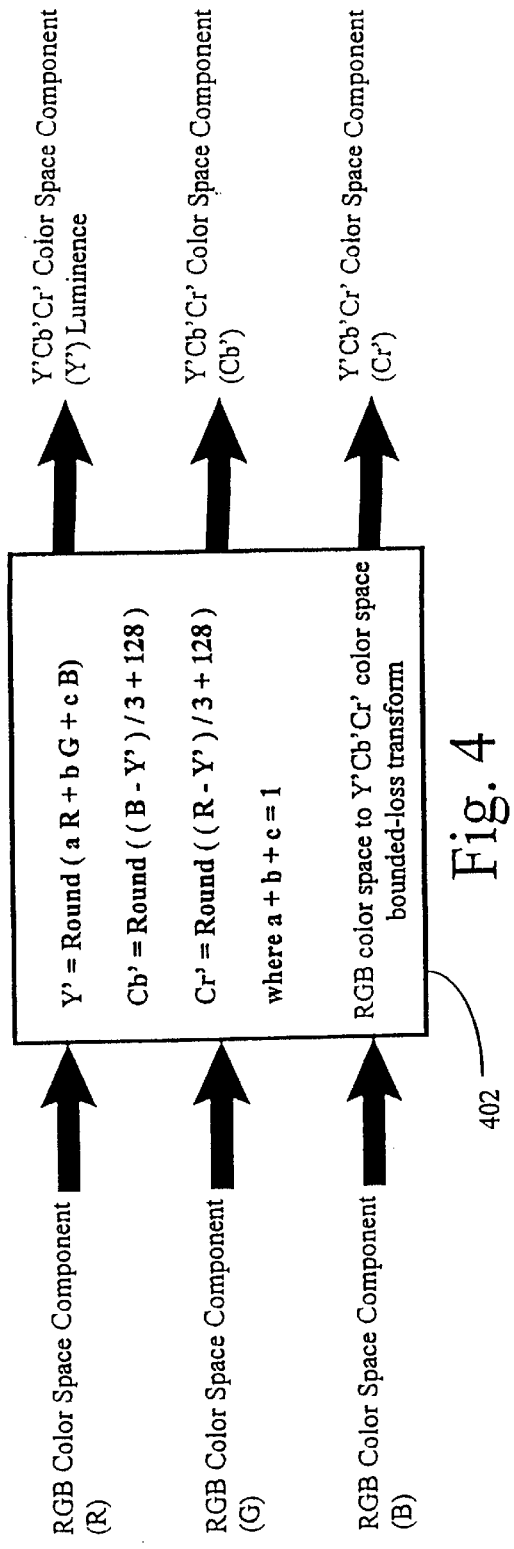
FIG. 4 is a block diagram of an RGB color space to Y'Cb'Cr' color space bounded-loss transformer.
Figure 5:
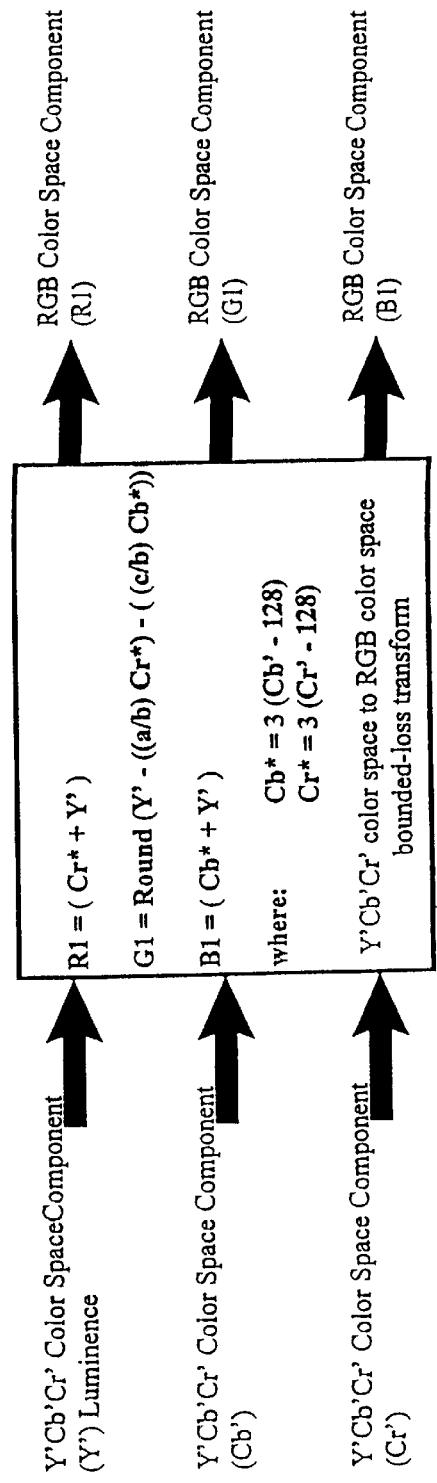
FIG. 5 is a block diagram of a Y'Cb'Cr' color space to RGB color space bounded-loss transformer.

Referring now to FIGS. 4 and 5, bounded-loss color transformers for two color spaces are shown which bound the loss to ±1 (where 1 is, for example, the noise-level of an image). More particularly, an RGB color space to Y'Cb'Cr' color space bounded-loss transformer 402 is illustrated in FIG. 4 and a Y'Cb'Cr' color space to RGB color space bounded-loss transformer 502 is shown in FIG. 5. In the embodiments, R, G, B, and Y', Cb', Cr' are integer values from 0 to at most 255 for 8-bit images. The notation Y'Cb'Cr' denotes a non-conventional transform.

Referring now to FIG. 4 specifically, the inputs to transformer 402 are the RGB color space components R, G, and B. The transformer 402 applies the following formulas (1)–(4) to arrive at the Y'Cb'Cr' color space components Y', Cb', and Cr':

$$Y' = \text{Round}(aR + bG + cB) \quad (1)$$

$$Cb' = \text{Round}((B - Y')/3 + 128) \quad (2)$$

$$Cr' = \text{Round}((R - Y')/3 + 128) \quad (3)$$

where $$a + b + c = 1 \quad (4)$$

Referring now to FIG. 5 specifically, the inputs to transformer 502 are the Y'Cb'Cr' color space components Y', Cb', and Cr' . The transformer 502 applies the following formulas to arrive at the RGB color space components R1, G1, and B1:

$$R1 = (Cr^* + Y') \quad (5)$$

$$G1 = \text{Round}(Y' - ((a/b)Cr^*) - ((c/b)Cb^*)) \quad (6)$$

$$B1 = (Cb^* + Y') \quad (7)$$

where:

$$Cb^* = 3(Cb' - 128) \quad (8)$$

$$Cr^* = 3(Cr' - 128) \quad (9)$$

The term "Round" indicates a rounding operation to arrive at an integer value.

It can be further determined that the application of transformation formulas (1)–(9) for certain a, b, and c values provides for transformations that yield losses which are less than or equal to 1 (i.e., the designed acceptable loss). The values of a, b, and c are chosen such that the loss introduced in the RGB components R and B must not yield a larger loss than desired in G. Though an exhaustive search for these values has not been performed, illustrated in Table 1 are values which have been exhaustively tested and which satisfy the above criteria. Accordingly, the values listed in Table 1 provide that $|R-R1| \leq 1$, $|G-G1| \leq 1$, and $|B-B1| \leq 1$.

TABLE 1

| (a, b, c)         | Range Y' | Range Cb' | Range Cr' |
|-------------------|----------|-----------|-----------|
| (0.2, 0.7, 0.1)   | 0, 255   | 52, 204   | 60, 196   |
| (0.25, 0.65, 0.1) | 0, 255   | 52, 204   | 64, 192   |
| (0.28, 0.62, 0.1) | 0, 255   | 51, 204   | 66, 190   |
| (0.29, 0.61, 0.1) | 0, 255   | 51, 204   | 68, 188   |

Referring now to FIGS. 6 and 7, bounded-loss color transformers for two color spaces (RGB to C'M'Y' and C'M'Y' to RGB) are shown which bound the loss to ±1. More particularly, an RGB color space to C'M'Y' color space bounded-loss transformer 602 is illustrated in FIG. 6 and a C'M'Y' color space to RGB color space bounded-loss transformer 702 is shown in FIG. 7. In the embodiments, R, G, B, and C', M', Y' are integer values from 0 to at most 255 for 8-bit images. The notation C'M'Y' denotes a non-conventional transform.

Referring now to FIG. 6 specifically, the inputs to transformer 602 are the RGB color space components R, G, and B. The transformer 602 applies the following formulas (10)–(12) to arrive at the C'M'Y' color space components C', M', and Y':

$$C' = \text{Round}((255 - R)/3) \quad (10)$$
$$M' = \text{Round}((255 - G)/3) \quad (11)$$
$$Y' = \text{Round}((255 - B)/3) \quad (12)$$

Referring now to FIG. 7 specifically, the inputs to transformer 702 are the C'M'Y' color space components C', M', and Y'. The transformer 702 applies the following formulas to arrive at the RGB color space components R1, G1, and B1:

$$R1 = (255 - 3(C')) \quad (13)$$
$$G1 = (255 - 3(M')) \quad (14)$$
$$B1 = (255 - 3(Y')) \quad (15)$$

Just as in the case of the transformers of FIGS. 4 and 5, it has been determined that the application of transformation formulas (10)–(15) provide transformation losses which are less than or equal to 1 (i.e., the noise-level). Specifically, the differences between the original RGB color space components and the reconstructed RGB color space components are such that $|R-R1| \leq 1$, $|G-G1| \leq 1$, and $|B-B1| \leq 1$.

A general approach to bounding the loss in an RGB to C'M'Y' color space transform and a C'M'Y' to RGB color space transform will now be presented. Specifically, the bounded-loss RGB color space to C'M'Y' color space transformation is governed by the following equations (16)–(18):

$$C' = \text{Round}((255-R)/D) \quad (16)$$
$$M' = \text{Round}((255-G)/D) \quad (17)$$
$$Y' = \text{Round}((255-B)/D) \quad (18)$$

The bounded-loss C'M'Y' color space to RGB color space transformation is governed by the following equations (19)–(21):

$$R1 = (255 - D(C')) \quad (19)$$
$$G1 = (255 - D(M')) \quad (20)$$
$$B1 = (255 - D(Y')) \quad (21)$$

In equations (16–21), the variable D is represented by equation (22):

$$D = 2(E) + 1 \quad (22)$$

where the variable E is the loss or error by which the transformation shall be bound. The application of equations (16)–(22) results in the differences between the original RGB color space components and the reconstructed RGB color space components being $|R-R1| \leq E$, $|G-G1| \leq E$, and $|B-B1| \leq E$.

Figure 8:
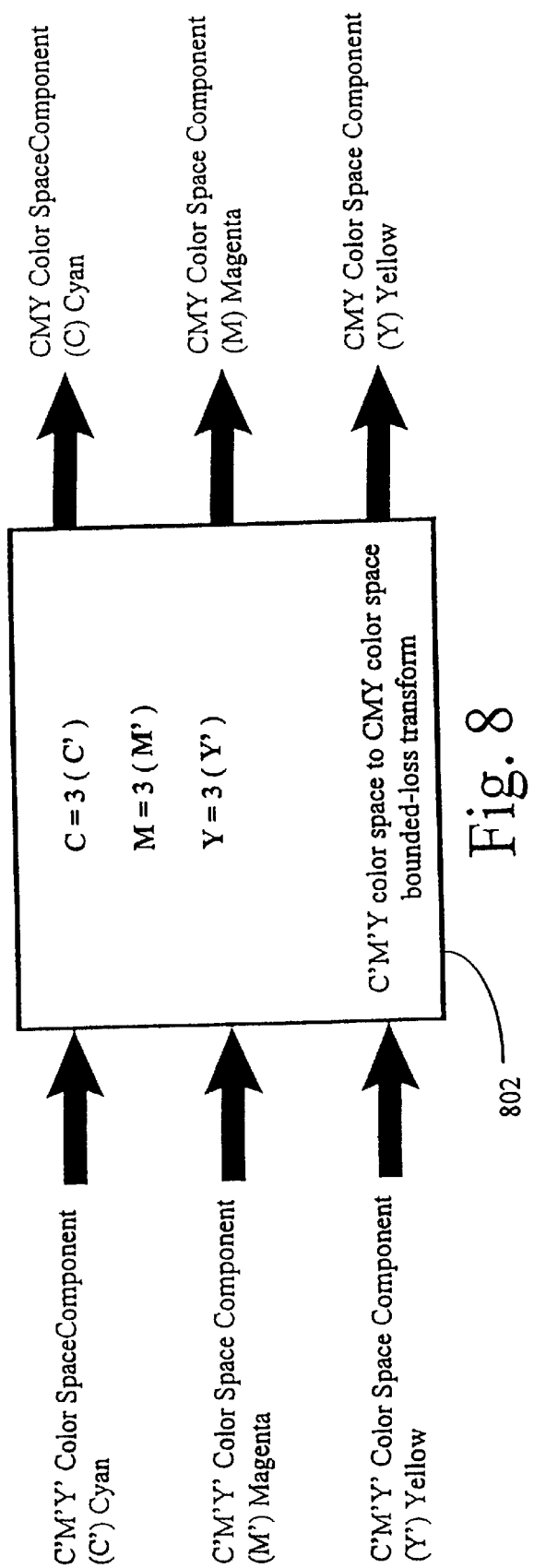
FIG. 8 is a block diagram of a C'M'Y' color space to traditional CMY color space transformer.

Illustrated in FIG. 8 is C'M'Y' color space to traditional CMY color space transformer 802. The transformer 802 is governed by the following equations:

$$C = 3(C') \quad (23)$$
$$M = 3(M') \quad (24)$$
$$Y = 3(Y') \quad (25)$$

A lossless compression of the C'M'Y' components results in at most a ±1 error after the transformation to CMY color space. If the C'M'Y' components are compressed with bounded error, the error bounds are added.

Figure 9:
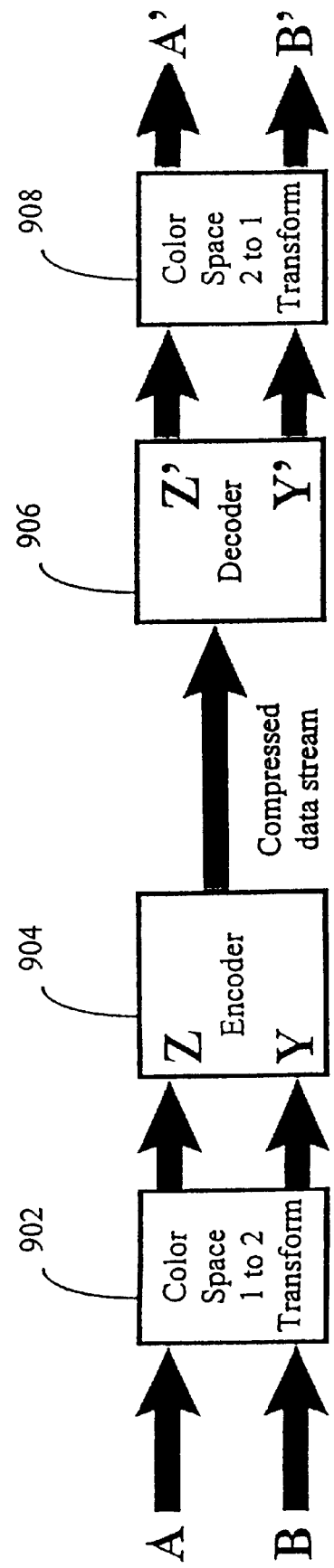
FIG. 9 is block diagram of a system incorporating bounded-loss color space transformation.

Referring now to FIG. 9, a block diagram of a compression/decompression system incorporating color space transformations with bounded losses is shown. Specifically, the system includes color space 1 to color space 2 transformer 902, encoder 904, decoder 906, and color space 2 to color space 1 transformer 908. Bounded-loss color space transformers 902 and 908 may be any bounded-loss color space transformer created according to the present invention, such as the transformers of FIGS. 4 and 5 or FIGS. 6 and 7. The encoder 904 and decoder 906 are preferably JPEG baseline encoders and decoders. Alternatively, they may be created according to any known compression/decompression technique which is capable of handling color space component data.

The system of FIG. 9 operates by inputting color space 1 components (e.g., A and B) into color space 1 to color space 2 transformer 902. Color space 1 to color space 2 transformer 902 generates color space 2 components (e.g., Z and Y) which are input into encoder 904. Encoder 904 generates a compressed data stream which is ultimately input into decoder 906 to generate reconstructed color space 2 components (e.g., Z' and Y'). The reconstructed color space 2 components (e.g., Z' and Y') are input into and color space 2 to color space 1 transformer 908 to generate color space 1 components (e.g., A' and B'). The difference between the reverse transformed color space 1 components (e.g., A' and B') and the original color space 1 components (e.g., A and B) is accordingly bounded by the loss due to the color space transformers 902 and 906 and any loss from the compression/decompression by encoder 904 and decoder 906.

Referring now back to FIGS. 1, 2, and 3, the present invention further provides that transformers 106A,B and 202A,B and 204A,B and 206 and 302 and 304 may be bounded-loss transformers and that encoders 102 and 114 and decoder 104 may be employing a lossless compression technique. In this configuration, difference values are determined from the bounded-loss transformations, while a lossless compression technique is employed. Other combinations are also possible.

The embodiments of the present invention may be implemented as software or hardware logic in a general personal or specific purpose computer system. The computer system may be a desktop, floor standing, or portable microcomputer that is comprised of a system unit having a central processing unit (CPU) and associated volatile and non-volatile memory, including all RAM and BIOS ROM, a system monitor, a keyboard, one or more flexible diskette drives, a fixed disk storage drive (also known as a "hard drive"), CD-ROM drive, a "mouse", pointing device, and an optional printer. The computer system may further include modem or network connection devices which allow it to communicate with host computer systems. Examples of such personal computer systems include IBM's APTIVA® and THINK-PAD® computer systems.

As mentioned, these computer systems may employ the present invention as software or hardware logic. The software logic includes code written to be executed by the computer system's central processor or other processor, such as an on-board or board added DSP (Digital Signal Processor) and/or micro-controller. The code may be stored on a computer-readable medium such as a floppy disk or CD-ROM. Hardware logic embodiments include the present invention embodied in the form of an ASIC (Application Specific Integrated Circuit), combination of ASIC'S, and/or a programmed micro-controller. The code may further be embodied in a PROM or EEPROM which is readable by a computer system, processor, or controller.

While the present invention has been illustrated by the description of embodiments thereof, and while the embodiments have been described in considerable detail, it is not the intent of the applicants to restrict or in any way limit the scope of the appended claims to such detail. Additional advantages and modifications will readily appear to those skilled in the art. For example, other bounded-loss color transformations may be derived via the teachings of the present invention. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for the compression and decompression of digital multi-spectral images, the method comprising the steps of:

(a) transforming a first set of first color space components to a plurality of second color space components;

(b) compressing the plurality of second color space components to thereby generate second color space compressed data;

(c) reconstructing the second color space compressed data to a plurality of reconstructed second color space components;

(d) transforming the plurality of reconstructed second color space components to a second set of first color space components;

(e) determining component differences based on the difference between the first and second sets of first color space components;

(f) compressing the component differences; and (g) incorporating the second color space compressed data and the compressed component differences into a data stream.

2. The method of claim 1 wherein the step of compressing a plurality of second color space components to thereby generate second color space compressed data comprises the step of compressing via a JPEG standard.

3. The method of claim 1 wherein the step of compressing the component differences comprises the step of compressing via a differential JPEG standard.

4. The method of claim 1 wherein the step of determining component differences based on the difference between the first and second sets of first color space components comprises the step of inputting corresponding color space components into a difference unit.

5. The method of claim 1 wherein the first color space is based on a color space selected from a group consisting of RGB, L* a* b*, XYZ, L* u* v*, YUV, CMY, CMYK, YCbCr, YIQ, HSI, and HSV.

6. The method of claim 1 wherein the second color space is based on a color space selected from a group consisting of RGB, L* a* b*, XYZ, L* u* v*, YUV, CMY, CMYK, YCbCr, YIQ, HSI, and HSV.

* * * * *